(No Model.)  2 Sheets—Sheet 2.

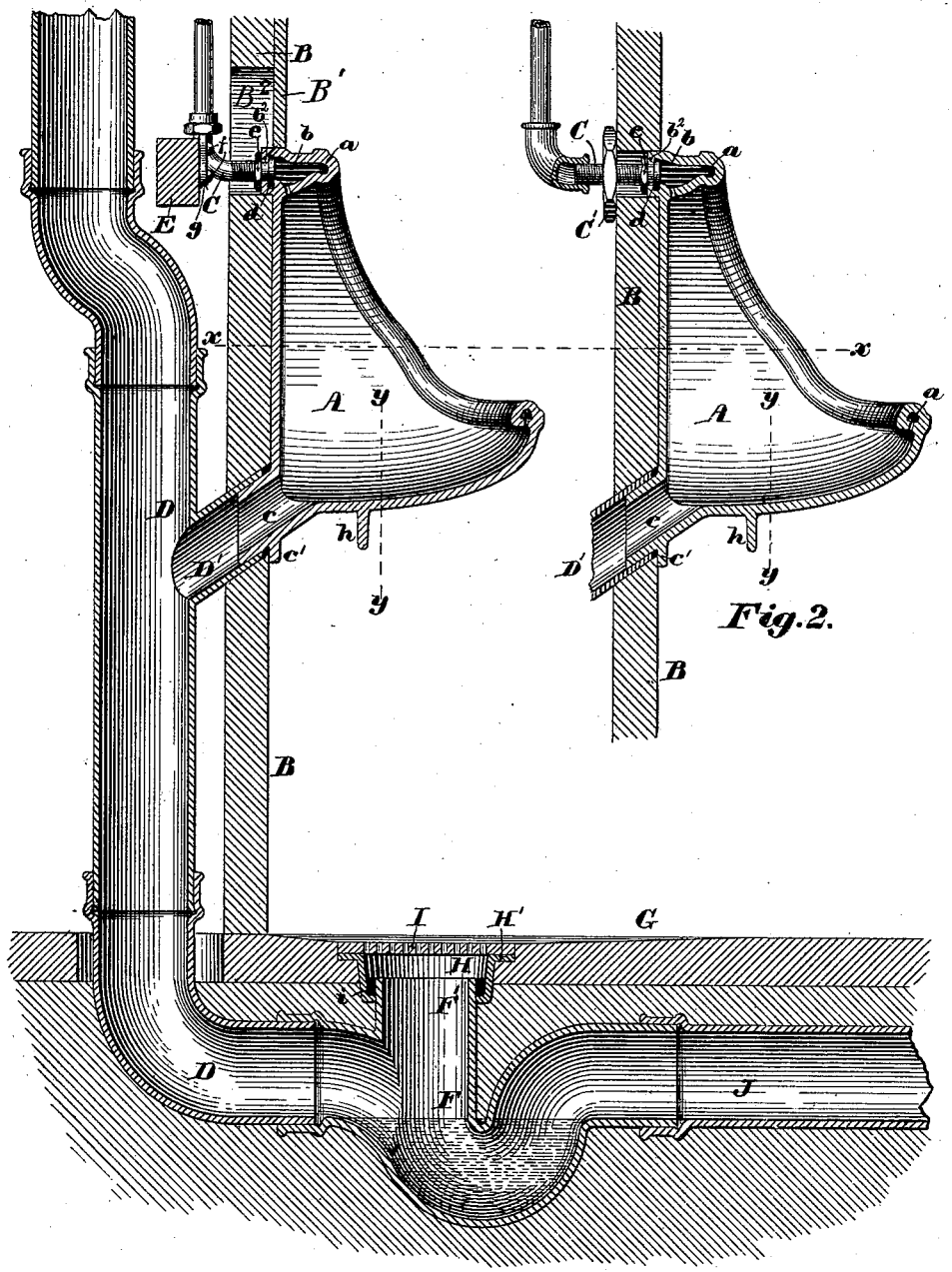

J. H. STEVENS.
URINAL.

No. 359,334.  Patented Mar. 15, 1887.

Witnesses:  
Inventor:  
John H. Stevens;  
by N. C. Lombard  
Attorney.

UNITED STATES PATENT OFFICE.

JOHN H. STEVENS, OF CAMBRIDGEPORT, MASSACHUSETTS.

URINAL.

SPECIFICATION forming part of Letters Patent No. 359,334, dated March 15, 1887.

Application filed May 12, 1884. Serial No. 131,185. (No model.)

*To all whom it may concern:*

Be it known that I, JOHN H. STEVENS, of Cambridgeport, in the county of Middlesex and State of Massachusetts, have invented certain new and useful Improvements in Urinals, of which the following, taken in connection with the accompanying drawings, is a specification.

My invention relates to the construction, ventilation, and mode of hanging urinals; and it consists, first, in providing the urinal-pan with a discharge-opening of large capacity, without strainer, and so located relative to the bottom and back vertical wall of said pan as to cut about equally into each, and extending through a short nozzle or hub projecting obliquely from said pan at an angle, say, of about forty-five degrees, as will be more fully described.

It further consists in the combination of a urinal-pan, a trap beneath the floor of the room and communicating with said room by means of a strainer, a ventilating-pipe leading to the open air, and a waste-pipe connecting said urinal-pan with the trap and the ventilating-pipe, and of sufficient capacity to convey to said trap all the liquid discharged into the pan for cleansing or otherwise, and at the same time permit the free passage of air from the room through the discharge of the pan and through the strainer in the floor above the trap, and thence to the open air.

It further consists in an improved method of securing the pan in position upon the wall, which will be readily understood by reference to the description of the drawings and to the claims to be hereinafter given.

Figure 3:
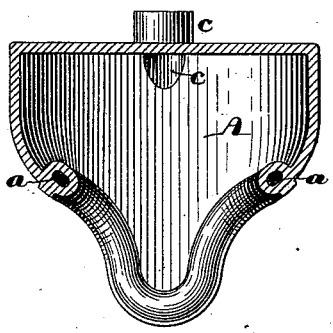
Figure 4:
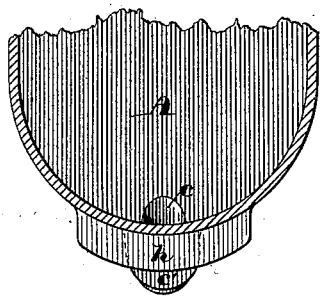

Figure 1 of the drawings is a vertical section through a urinal and a portion of the floor and one wall of a room containing the same, together with the trap and portions of the waste and ventilating pipes, all illustrating my invention. Fig. 2 is a central vertical section through the urinal-pan and the wall to which it is secured, and illustrates another way of securing the pan to the wall. Fig. 3 is a horizontal section through the pan on line $x\ x$ on Figs. 1 and 2. Fig. 4 is a partial sectional elevation, the cutting plane being on line $y\ y$ on Figs. 1 and 2; and Fig. 5 is a partial elevation of the rear side of the pan, and illustrates the socket in which is secured the water-supply or flushing pipe.

A is the urinal-pan, provided with the usual rim-flushing channel, $a$, and with the rearwardly-projecting inlet-nozzle $b$ and the discharge-nozzle $c$, projecting obliquely from the lower corner of the pan to the rear, as shown. The nozzle $c$ is provided upon its lower side with the flange $c'$, which, with the back side of the pan, bears against the wall B, to which the pan is secured, and covers the joint of the opening in said wall around the nozzle $c$.

Figure 5:
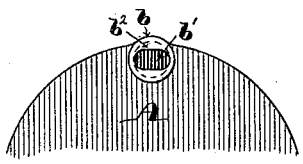

The opening $b'$ in the outer portion of the rearwardly-projecting hub or nozzle $b$ is of an oval form, as shown in Fig. 5; but inside of the lip $b^2$ the opening is circular, so that the collar $d$, which is formed upon or secured to the inner end of the supply-pipe C and is made of a size and shape to pass freely through the oval opening $b'$, may be turned therein till its longest diameter is at right angles with the longest diameter of the oval opening $b'$ and the ends of said collar engage with the inner surface of the lip $b^2$, in which position it is secured by screwing up the nut $e$ against the end of the hub or nozzle $b$, as shown in Figs. 1 and 2.

The oblique discharge-nozzle $c$ is fitted into the oblique branch D' of the iron waste and ventilating pipe D, with the back of the pan A fitting closely against the wall B, and the pan is secured in position by means of the pipe C and nut C', as shown in Fig. 2, or by securing the pipe C to the timber E by means of screws $f\ f$, passing through ears $g$, formed upon said pipe, as shown in Fig. 1. The urinal-pan A is also provided with the drip-flange $h$, which depends from the lower side thereof, as shown in Figs. 1, 2, and 4, and serves to prevent any urine which may be accidentally deposited upon the outside of the pan from reaching the wall B and fouling the same.

F is a trap located beneath the floor G, which is made preferably of stone and concaved, as shown, said trap being provided with the upwardly-projecting pipe F', the upper end of which is open and is inserted in the cup H, made preferably of galvanized iron and provided with the flange H', by which it is supported in a circular recess formed in the upper side of the stone floor G, as shown in Fig. 1.

The cup H and pipe F' are secured together, so as to form a water-tight joint, by the packing $i$, and the mouth of the cup H is covered by the porcelain strainer I, so fitted to the recess formed in the stone floor as to substantially fill the same and cover the flange of the cup, but so that it may be readily removed for cleaning the trap. The trap F is connected at one end to the pipe J, which leads to and communicates with the sewer or drain, and at the other end with the ventilating-pipe D, which also serves as a waste-pipe for the urinal A, all as shown in Fig. 1. The trap F, pipe F', and pipe D are made of a diameter of at least four inches, so that any possible supply of water to the urinal may be freely discharged therefrom and conveyed to the trap without impeding the free ventilation of the trap and through the strainer I the room containing the urinal, and so that the trap may be readily cleaned by removing the strainer I and inserting the hand through the pipe F'.

By this construction and arrangement of parts the wall B may be kept perfectly clean and free from foul matter, and the floor G, by virtue of the direct connection of the trap with the ventilating-pipe by a passage so large that the flow of water cannot obstruct the draft and the communication between the trap and the upper surface of the floor, may be kept very clean. The ventilating-pipe D, of course, extends to the top of the building and communicates with the open air, in a well-known manner.

The discharge-orifice leading from the urinal-pan A to the waste and ventilating pipe D is made so large and is so located that it perfectly drains the pan, and any paper or other foreign matter that is liable to be deposited therein will be readily discharged into the large pipe and carried into the drain or deposited in the trap, from which it may be readily removed, as before described.

Another advantage of my invention is that the pipes are all behind the wall B and beneath the floor G, and no fastening bolts or screws and projecting ears, as a means of securing the pan in position, are used inside the room, whereby the wall B may be much more easily kept clean.

The operation of my invention will be readily understood from the foregoing without further explanation.

B' is a cover to the opening B² through the wall B, made for the purpose of giving access to the fastenings of the pipe C, as shown in Fig. 1.

What I claim as new, and desire to secure by Letters Patent of the United States, is—

1. A urinal-pan having a straight vertical back wall and a curved front and bottom meeting said back wall at a right angle, or nearly so, and provided with the oblique discharge-nozzle $c$, the opening through which cuts about equally into the bottom and the back wall of said pan, substantially as shown and described.

2. A urinal-pan having a straight vertical back wall, a curved front and bottom meeting said back wall at an angle, and provided with the rearwardly-projecting hub $b$ and the oblique discharge-nozzle $c$, in combination with the discharge-pipe D, placed upon the opposite side of the wall B from said pan and provided with the oblique branch D', fitted and connected to the oblique nozzle $c$ by a slip-joint, and the supply-pipe C, connected to the hub $b$ and secured in position by a nut or screw upon the back side of the wall B, substantially as shown and described.

3. The combination of a urinal-pan, a trap located beneath the floor of the room and communicating with said room through a strainer, a ventilating-pipe communicating with the open air, and a pipe connecting said trap with the urinal-pan and with said ventilating-pipe, of sufficient capacity and so connected as to serve the purpose of conveying the urine and the flushing-water from said pan to the trap, and at the same time to thoroughly ventilate the pan, the trap, and the floor of the room, substantially as described.

4. The urinal-pan A, secured to the wall B by means of the oblique nozzle $c$, waste-pipe D D', connected to said oblique nozzle by a slip-joint only, and the supply-pipe C, coupled to the pan A and secured in position by a nut or screw upon the back side of the wall B, substantially as described.

In testimony whereof I have signed my name to this specification, in the presence of two subscribing witnesses, on this 10th day of May, A. D. 1884.

JOHN H. STEVENS.

Witnesses:
N. C. LOMBARD,
WALTER E. LOMBARD.